United States Patent [19]

Schwalm et al.

[11] Patent Number: 4,556,830
[45] Date of Patent: Dec. 3, 1985

[54] SPEED CONTROLLER FOR MILL DRIVES AND THE LIKE

[75] Inventors: Charles L. Schwalm; Walter A. Hill, both of Peterborough, Canada

[73] Assignee: Canadian General Electric Company Limited, Toronto, Canada

[21] Appl. No.: 651,945

[22] Filed: Sep. 19, 1984

Related U.S. Application Data

[63] Continuation-in-part of Ser. No. 588,002, Mar. 9, 1984.

[30] Foreign Application Priority Data

Mar. 31, 1983 [CA] Canada .................................. 424992

[51] Int. Cl.[4] .......................... G05B 5/00; H02D 5/16
[52] U.S. Cl. .................................... 318/326; 318/329; 318/434; 318/331; 318/317
[58] Field of Search ............................... 318/301–329, 318/332, 337, 338, 339, 345 A, 430–434, 438, 599, 606, 615–619, 628, 632, 633, 638, 696, 636

[56] References Cited

U.S. PATENT DOCUMENTS

| | | | |
|---|---|---|---|
| 3,617,844 | 11/1971 | Grygera | 318/327 X |
| 4,243,921 | 1/1981 | Tamura et al. | 318/314 |
| 4,268,782 | 5/1981 | Kawada et al. | 318/434 |
| 4,311,951 | 1/1982 | Walker et al. | 318/430 X |
| 4,446,409 | 5/1984 | Rawicz et al. | 318/327 X |
| 4,476,417 | 10/1984 | Zimmermann | 318/326 X |

Primary Examiner—William M. Shoop, Jr.
Assistant Examiner—Shik Luen Paul Ip
Attorney, Agent, or Firm—Raymond A. Eckersley

[57] ABSTRACT

A speed controller for a mill drive has two control portions. The first control portion has a first speed of response for controlling mill speed during normal operation. The second control portion has a second speed of response, faster than the first speed of response, for controlling mill speed following abrupt changes in load torque. The first control portion has a reference speed input and this is compared with actual motor speed and the result gives a current reference signal. The current reference signal is compared with a signal representing actual current to derive an error signal used to control the supply of power to the motor. The second control portion multiplies the current reference signal with a signal representing flux to provide a signal representing a model of developed torque. This is compared with a signal representing a model of load torque and the difference integrated to provide a signal representing a model of motor speed. This is compared with actual motor speed and the difference integrated to provide the previously referred to model of load torque. The model of load torque signal is differentiated to provide a compensating speed signal. The compensating speed signal is used to adjust the comparison, in the first portion, of reference speed and actual speed.

3 Claims, 4 Drawing Figures

SPEED CONTROLLER FOR MILL DRIVES AND THE LIKE

CROSS REFERENCE

This application is a continuation-in-part of application Ser. No. 588,002, filed Mar. 9, 1984.

BACKGROUND OF THE INVENTION

This invention relates to improved speed controlling apparatus for a mill drive.

The invention will be described in relation to a steel rolling mill but it will be apparent that it could be used in drives for other mills and as a speed controller for other apparatus where similar conditions occur.

Speed control apparatus is well known for controlling mill speed. Basically such control apparatus has a sensor which detects actual mill speed and compares the actual speed with a reference speed or desired speed to derive an error signal. The error signal is used to control the power to the motors of the mill drive to reduce the error signal and cause the actual speed to approach the reference speed.

Speed control apparatus has a time constant or speed of response selected by the designers of the apparatus. The actual speed should be maintained as closely as possible to the reference speed and when a disturbance causes the actual mill speed to depart from its desired speed, it should be returned as quickly as possible to the desired speed. If, however, the speed of response is too rapid, then hunting or other instabilities may be introduced which might cause damage or excessive wear of the drive.

Selection of a suitable time constant is usually a compromise. The speed of response must not be so fast that minor changes in the actual speed cause hunting, but it must be fast enough to cause large deviations of the actual speed from the reference to return to the reference speed as soon as possible. In this connection it is known to use two response speeds: one when the error signal is below a certain level and the other when the error signal exceeds this certain level. While a two level system such as this is able to handle larger changes, it has a disruptive effect at the point of changeover.

A steel rolling mill, and perhaps other large mills, have conditions which make accurate speed control difficult. These mills are subject to fairly abrupt changes in load, for example, when a metal bar or ingot enters the bite of the rolls. Also, the mill drives are quite massive and have considerable inertia. The prior art speed control systems do not respond rapidly enough to abrupt changes in load torque to bring the mill back to speed in sufficient time for efficient mill operation.

SUMMARY OF THE INVENTION

The speed controller of this invention includes a speed controller of a type similar to the prior art having a first speed of response suitable for maintaining a desired speed for normal running and responding to minor variations. It also has a load torque compensator which receives signals representing armature current and motor speed and provides an electrical model representing particular motor parameters. From the electrical model a torque compensation signal is derived which is related to load torque and which is used to adjust the speed error signal to provide for a more rapid response to speed change caused by sudden load torque change. The speed of response of the load torque compensator, which is a second speed of response, is faster than the first speed of response.

It is therefore an object of the invention to provide a speed controller which adjusts the control signal in accordance with changes in load torque.

It is another object of the invention to provide improved speed control apparatus which uses an electrical model of certain motor parameters to provide a load torque compensating signal to adjust a signal which controls the speed of a motor to a reference speed.

It is yet another object of the invention to provide speed control apparatus for a mill which adjusts a speed control signal in response to a load torque signal derived from at least a signal representing armature current and a signal representing motor speed.

Accordingly there is provided speed control apparatus for a drive motor, comprising means for obtaining a difference signal between an input speed signal and an actual motor speed signal, and integrating said difference signal to provide a current reference signal, means for obtaining a difference signal between said current reference signal and an actual motor current signal and applying this difference signal to control current supplied to said motor, circuit means for receiving said current reference signal and a signal representing motor field current and deriving therefrom a signal representing a model of developed torque, means for obtaining a difference signal between said signal representing a model of developed torque and a signal representing a model of load torque, and integrating this difference signal to derive a signal representing a model of motor speed, means for obtaining a difference signal between said signal representing a model of motor speed and actual motor speed, and integrating this difference signal to derive said signal representing a model of load torque, means for differentiating said signal representing a model of load torque to provide a torque compensating speed signal and adjusting said difference signal between an input speed signal and an actual motor speed signal to control motor speed for a faster response to load torque changes.

BRIEF DESCRIPTION OF THE DRAWINGS

The invention will be explained in more detail with reference to the accompanying drawings, in which.

DESCRIPTION OF THE PREFERRED EMBODIMENT

Figure 1:
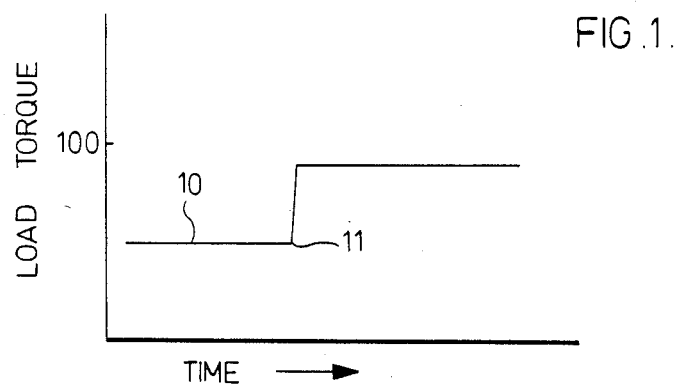
FIG. 1 is a graph of load torque plotted against time illustrating an abrupt change in load torque.
Figure 2:
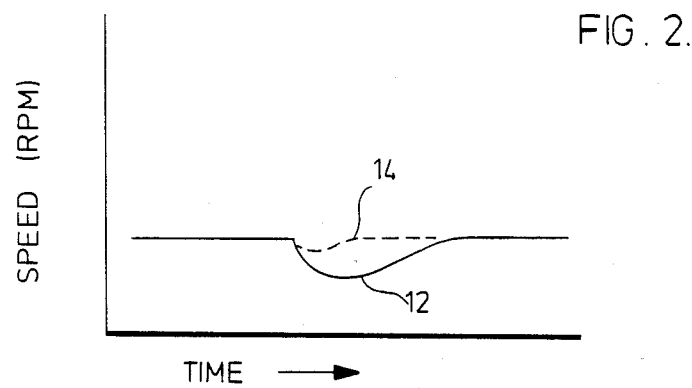
FIG. 2 is a graph of motor speed plotted against time showing a variation in speed caused by a change in load torque.

Referring to FIG. 1, curve 10 represents load torque plotted against time and shows an abrupt increase in load torque at point 11 such as might occur in a steel rolling mill. Referring now to FIG. 2, the curve 12 represents motor speed or rpm of a mill drive plotted against time. The curve 12 (solid line) shows, as an example, the change of speed that might occur in a prior art control following an abrupt increase in load torque (as at 11 in FIG. 1). It will be seen that the increase in load torque causes a sudden decrease in speed which is corrected by the speed controller until the speed returns to the reference or desired value. Curve 14 (broken line) shows, as an example, the change of speed that might occur with the speed controller of the present invention. It is desirable to keep the area defined by the displacement of the curve to a minimum, and thus curve 14 shows an improved operation with respect to curve 12.

Figure 3:
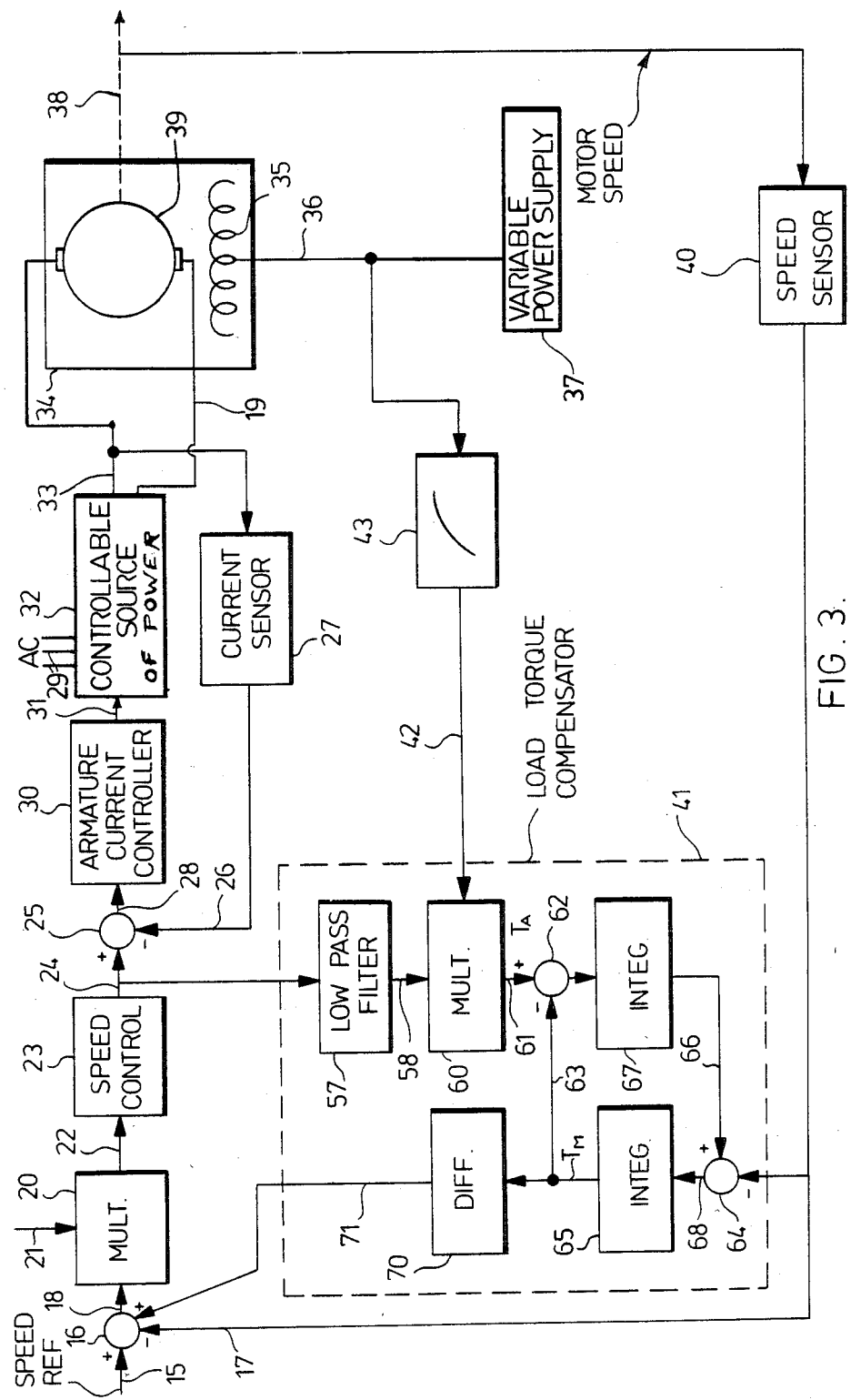
FIG. 3 is a simplified block schematic diagram of a speed controller according to the invention.

Referring now to FIG. 3, there is shown a simplified block schematic diagram of a known form of speed controller with the load torque compensator of the present invention incorporated. A speed reference signal is applied to the speed controller at input 15. This speed reference signal represents the desired speed at which the motor is to run. The speed reference signal at input 15 is applied to an adder 16. A motor speed signal, representing actual motor speed, is on conductor 17 and this is also applied to adder 16. There is another input to adder 16 representing a signal from the load torque compensator according to the invention and this will be discussed hereinafter. Neglecting this third input for the time being, adder 16 receives a signal representing desired speed (input 15) and a signal representing actual speed (conductor 17) and it provides an error signal or difference signal on conductor 18 which is applied to a multiplier/divider 20. This multiplier/divider 20, which is subsequently referred to as a multiplier although it can multiply or divide as required, is included for completeness and is not required under all circumstances.

If the motor that is being controlled is not intended to run above base speed, then multiplier 20 is not required, that is, there is a multiplication of one. Base speed of the motor is defined as the speed at which the motor runs with full field and normal or rated volts on the armature. The flux in the motor will change when running above base speed because the field is reduced. Therefore, when running above base speed, a signal proportional to the inverse of the flux can be introduced at input 21 to multiplier 20 and the error signal on conductor 18 is multiplied by the signal at 21. The signal at input 21 can be derived from a sensor connected to the motor field or to the field supply. When the motor is running at or below base speed the error signal on conductor 18 passes through multiplier 20 and appears unchanged on conductor 22.

Conductor 22 is connected to an integrating speed controller 23 which integrates the error signal on conductor 22 and provides on conductor 24 a current reference signal. This current reference signal represents the current in the motor which will provide the desired motor speed. It is applied to adder 25. Also applied to adder 25, on conductor 26, is a signal from current sensor 27 which senses armature current. Thus the adder 25 receives a current reference signal and an actual current signal and it provides on conductor 28 a difference or error signal. This error signal is applied to armature current controller 30 which, in turn, provides control signals via conductor 31 to power converter 32. A controllable power source, such as a power converter 32, which receives power from a normal AC power system indicated by conductors 29, normally would comprise thyristors which are appropriately triggered by the signals on conductor 31 to provide the desired controlled current output on conductor 33. It is this current that is sensed by current sensor 27 previously mentioned.

The conductor 33 provides power for motor 34 shown in schematic form and having an armature 39, that is, conductor 33 provides current to the armature 39, and more particularly to the main winding of armature 39. Conductor 19 provide the return path. Motor 34 has a field 35 supplied with power over conductor 36 from a variable, controllable, field supply 37 or power supply 37 which may be another converter or a battery supply or any other suitable source of power. Motor 34 has an output drive shaft 38, represented by a broken line from armature 39, which is coupled to a mill or other load (not shown). A speed sensor 40 is connected to the motor output to derive a signal representing speed which signal is provided on conductor 17 previously described.

The description thus far relates to speed controllers of a type known in the prior art. Briefly, a speed reference signal is provided to the speed controller and is compared to a signal representing actual drive speed. An error signal is derived from the comparison, integrated, and used to provide a current reference signal. The current reference signal is compared to a signal representing actual armature current and an error signal derived which is used to control power to drive the motor. The present invention adds a load torque compensator which will now be described.

Load torque compensator 41 has three inputs. One input is an actual speed signal on conductor 17, another is the current reference signal on conductor 24, and the third input is a flux signal on conductor 42. The flux signal is obtained from a non-linear circuit 43 which receives an input on conductor 36 representing the field current and provides as an output, on conductor 42, a signal representing flux. The load torque compensator 41, as was indicated previously, provides an electrical model of the motor in order to determine a compensating signal. This may be better understood if a suitable equivalent circuit of the motor is developed. There is an equivalent motor circuit shown in FIG. 4 which involves relevant motor parameters.

Figure 4:
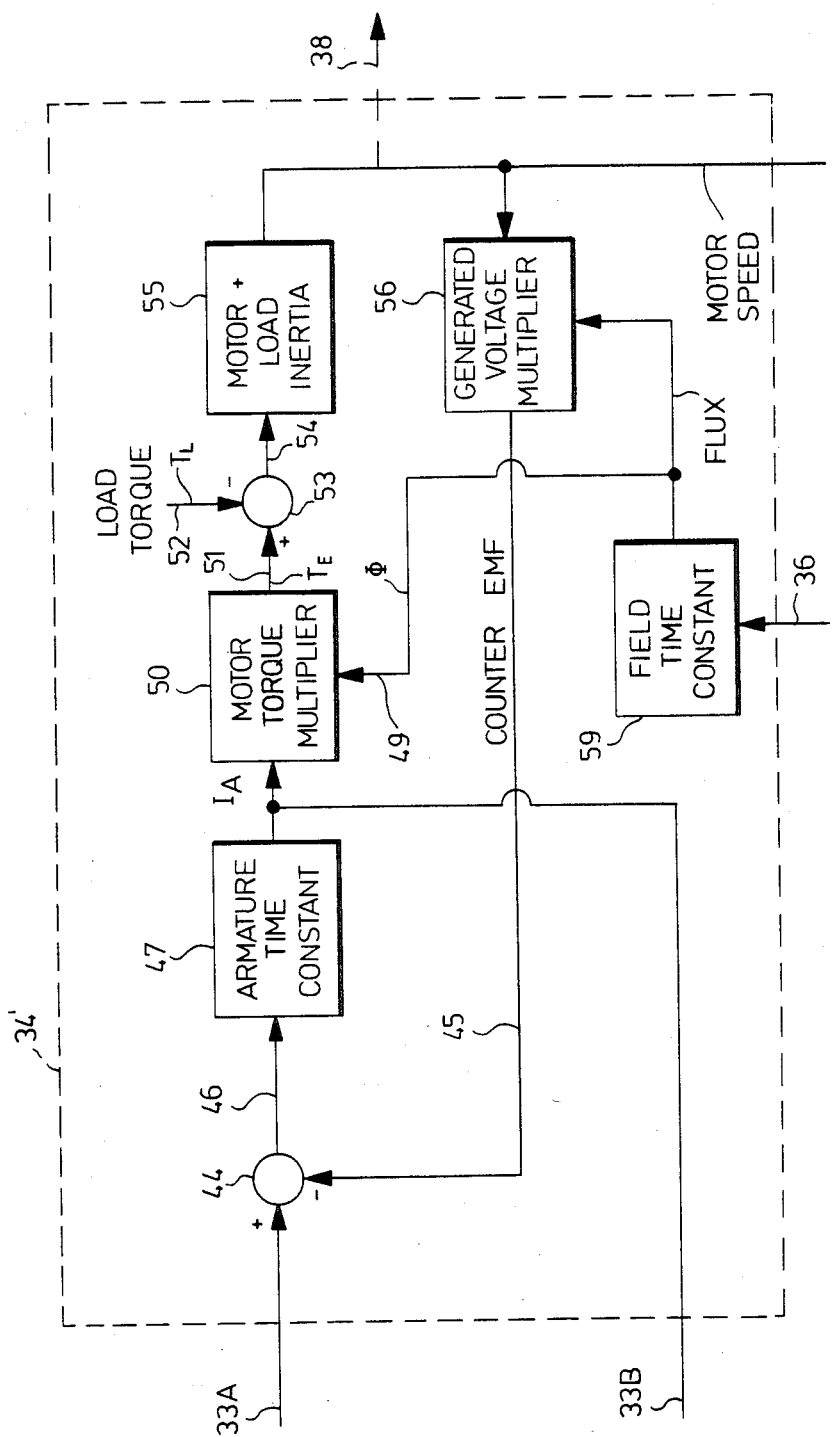
FIG. 4 is an equivalent circuit of a motor, useful in explaining the invention.

Referring to FIG. 4, an equivalent circuit 34' for the motor 34 is shown. It must be remembered that a number of equivalent circuits might be developed to evaluate different parameters and FIG. 4 is only one equivalent circuit that is useful in this instance. In FIG. 4 the input is shown at 33A. This would be the output of power converter 32 (FIG. 3) and it represents in FIG. 4 a voltage which is applied to adder 44. Also applied to adder 44 is a voltage signal on conductor 45 representing counter emf (i.e., counter electromotive force). The difference signal on conductor 46 represents voltage available to cause armature current to flow. This is treated by block 47 representing the armature time constant. When armature time constant is considered, the current that is flowing in the armature at any time is determined and represented by a signal on conductor 33B. This is, in effect, the current sensed by current sensor 27 (FIG. 3). This signal is applied to a motor torque multiplier representation 50 which also receives on conductor 49 a signal representing flux and which converts the current signal to an electrical torque signal $T_E$ representing developed torque and available on conductor 51. Load torque $T_L$ which is, of course, the load torque on shaft 38 is an unknown variable and is represented in the equivalent circuit by the input at 52 to adder 53. Adder 53 thus receives signals representing developed torque and load torque and provides on conductor 54 a difference or error signal representing torque available to accelerate (or decelerate) the load. This net torque signal on conductor 54 is applied to a box 55 representing the inertia of the motor plus the load. When the total inertia is considered the result is the motor speed, i.e., the RPM of shaft 38. The speed is applied to a generated voltage multiplier circuit representation 56 which multiplies flux and speed to yield a counter emf signal on conductor 45. The flux signal on conductor 49 is obtained from field time constant circuit 59. The circuit 59 receives a signal representing field current from conductor 36 (see also FIG. 3) and determines an actual flux signal which is applied over conductor 49 to multiplier 50 and to multiplier 56. It is believed the equivalent circuit of motor 34, as shown in FIG. 4, should be clear. It should be emphasized that the equivalent motor circuit of FIG. 4 is not part of the invention and is included only because it may aid in understanding the invention.

Referring once more to FIG. 3, conductor 24, which carries the current reference signal, is connected to low pass filter 57 in load torque compensator 41. Low pass filter 57 removes any high frequency disturbances and the resulting filtered signal is applied over conductor 58 to multiplier 60. It will be recalled that there is a signal representing flux on conductor 42. The multiplier 60 uses the current reference signal and the flux signal to provide an output signal $T_A$ which represents the electrical model value of electrical torque or developed torque. It will be recalled that in the equivalent circuit of the motor (FIG. 4), the actual current (i.e., current considering the armature time constant) and the flux are used to obtain $T_E$.

The signal $T_A$ is on conductor 61 and is applied as one input to adder 62. The other input to adder 62 is a signal $T_M$ on conductor 63 representing the electrical model of load torque. This is the model of the signal $T_L$ (FIG. 4). The signal TM representing the model of load torque is obtained from integrator 65 as will be described. An adder 64 receives a signal from conductor 17 representing actual speed from speed sensor 40. Adder 64 also receives a signal from integrator 67 on conductor 66 and this signal represents model speed. Integrator 67 receives from adder 62 a signal which is the difference between $T_A$ and $T_M$, that is the difference between the model value of developed torque and the model value of load torque (model adder 62 may be considered to be similar to adder 53 in the equivalent circuit, FIG. 4). Integrator 67 integrates and scales the signal from adder 62 to account for motor and load inertia, and provides on conductor 66 a signal representing motor speed according to the model. Thus, adder 64 receives a signal representing actual speed and a signal representing model speed. These should be the same if there is no load torque.

If there is a load torque there will be a difference signal on conductor 68 which is integrated by integrator 65 to produce a signal representing model torque, $T_M$. As has been explained $T_M$ and $T_A$ are compared and the difference used to correct the model of motor speed to match actual motor speed.

The signal $T_M$ on conductor 63 is also applied to differentiator 70 where it is differentiated to obtain speed correction and applied over conductor 71 to adder 16.

A brief description of the operation may provide a better understanding of the invention. If there is no load torque, then the developed torque $T_E$ will drive the motor at a certain speed and the speed will be sensed by sensor 40 and a speed signal fed back on conductor 17 to adder 16. The actual speed signal and the reference speed signal will be substantially equal and the motor will continue to run at that speed.

The signal on conductor 17 is also applied to adder 64. The actual speed signal and the model speed signal will be substantially equal and there will be no output from torque compensator 41 on conductor 71.

If a load torque $T_L$ is applied to the motor, the motor will accelerate (positively or negatively depending on whether the load torque is negative or positive) at a rate determined by the net accelerating torque $T_E$-$T_L$. In other words, the load torque is applied, the speed changes and the speed signal is fed back to adder 16, the speed control 23 alters the current to alter $T_E$ and the motor accelerates at a rate determined by $T_E$-$T_L$.

The speed change signal is also applied to adder 64 causing a change in model torque $T_M$ which is differentiated and added to the speed reference signal at adder 16. By designing the load compensator 41 with a faster transient response than that of the normal speed control and overall system transient response, then the speed regulating system of the invention will be able to respond to speed reference demands with the slower transient response and to load demands with the faster response. Thus the lower response supervises the system and ensures smooth speed changes with minimal steady state error, and the faster response enables good control to abrupt load changes.

The control of the invention provides, for example, good impact load speed performance when a metal bar enters the bite of a rolling mill drive. The control of the invention is applicable whenever a response is required that is significantly better than the normal reference speed response, for example, in hot and cold rolling mills, paper machine dryers and mine hoists where it is desirable to control rollback as hoist brakes are released.

What we claim as new and desire to secure by Letters Patent of the United States of America is:

1. Speed control apparatus for a drive motor having an armature and a field winding, and having a power supply and a power source for providing current to said field winding and to said armature respectively, at least said power source being controllable, said apparatus having a first speed control portion with a first speed of response and a second speed control torque compensation portion with a second speed of response, said first speed control portion comprising means for providing a first signal representing the difference between an input speed reference signal and an actual motor speed signal, first integrating means for integrating said first signal and providing a second signal representing a desired current, means connected to said first integrating means and said power source for providing a third signal representing the difference between said second signal and an actual current signal from said power source, means responsive to said third signal for controlling said power source to provide a current which approaches said desired current, said second speed control portion comprising, means receiving said second signal and a signal representing field current and providing a fourth signal representing a model value of developed torque, means for securing said fourth signal and a fifth signal representing a model value of load torque and providing as a sixth signal a difference signal representing net torque,
second integrating means for receiving said sixth signal and providing a seventh signal representing a model of motor speed,
means for receiving said seventh signal and said actual motor speed signal and providing an eighth signal representing the difference,
third integrating means for integrating said eighth signal to provide said fifth signal,
differentiating means for receiving said fifth signal and providing as a compensating speed signal a ninth signal, and
means applying said ninth signal to adjust said first signal with abrupt changes in load torque,
said second speed of response being faster than said first speed of response to provide for rapid adjustment in response to changes in load torque.

2. Speed control apparatus according to claim 1 in which said power supply is controllable, said motor having a motor base operating speed and being operable above said motor base operating speed by reducing below rated field current the current provided by said first power source to said field winding, further comprising
means for receiving said first signal and modifying said first signal inversely as the flux when said field current is reduced below rated field current.

3. Speed control apparatus for a drive motor having an armature and a field winding and having a base motor speed when the field winding has full rated current, and having a power supply and a power source to provide current to said field winding and said armature respectively, said apparatus having a first control portion having a first speed of response to control motor speed during normal running and a second control portion having a second faster speed of response to adjust the control of motor speed during abrupt changes of load torque to compensate for the changes, said first control portion comprising
a sensor for sensing actual motor speed and providing a signal representing actual motor speed,
a first adder for receiving a speed reference input signal and from said sensor a signal representing actual motor speed and providing a first signal related to the difference,
circuitry for receiving said first signal and responsive to said field current being below said rated current modifying said first signal by a factor inversely proportional to the flux provided by said field,
first integrating means for receiving from said circuitry for receiving said first signal a modified first signal, integrating said first modified signal and providing a current reference signal related thereto,
a second adder for receiving from said integrating means said current reference signal and from said power source a signal representing actual current to said armature and providing a second signal related to the difference,
control means for said power source for receiving said second signal and responsive thereto for adjusting the current provided by said power source to cause said motor to run at a speed related to said speed reference input signal,
said second control portion comprising
non-linear circuit means for receiving a signal representing field current and providing a third signal related thereto and representing flux,
multiplier means for receiving said current reference signal and said third signal to provide a signal representing a model value of developed torque,
a third adder for receiving said signal representing said model value of developed torque and a signal representing a model value of load torque and providing a fourth signal related to the difference and representing a model value of a net torque available for acceleration,
second integrating means for receiving said fourth signal, integrating said fourth signal and providing a signal representing model motor speed,
a fourth adder for receiving from said second integrating means said signal representing model motor speed and from said sensor a signal representing actual motor speed and providing a fifth signal related to the difference,
third integrating means for receiving said fifth signal, integrating said fifth signal, and providing said signal representing said model value of load torque,
differentiating means for receiving said signal representing said model value of load torque, differentiating said signal and providing a sixth signal representing a compensating speed adjustment, and
means for applying said sixth signal to said first adder to adjust said first signal to compensate more rapidly for changes due to load torque.

* * * * *